W. FOWLER.
COOKING APPARATUS.
APPLICATION FILED MAY 6, 1910.

976,646.

Patented Nov. 22, 1910.
3 SHEETS—SHEET 1.

Witnesses

Inventor
W. Fowler
Attorney

W. FOWLER.
COOKING APPARATUS.
APPLICATION FILED MAY 6, 1910.

976,646.

Patented Nov. 22, 1910.
3 SHEETS—SHEET 2.

Witnesses

Inventor
W. Fowler
Attorney

W. FOWLER.
COOKING APPARATUS.
APPLICATION FILED MAY 6, 1910.
976,646.
Patented Nov. 22, 1910.
3 SHEETS—SHEET 3.
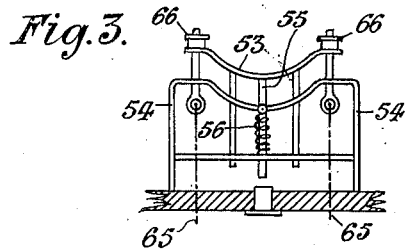
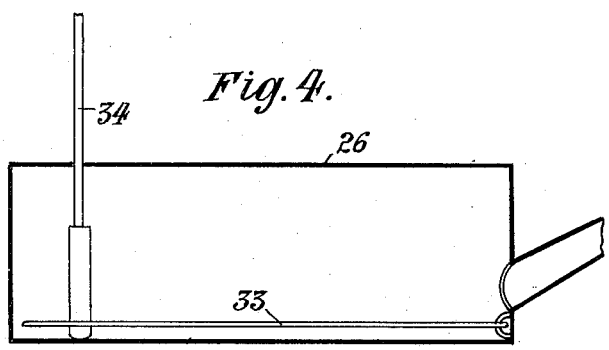
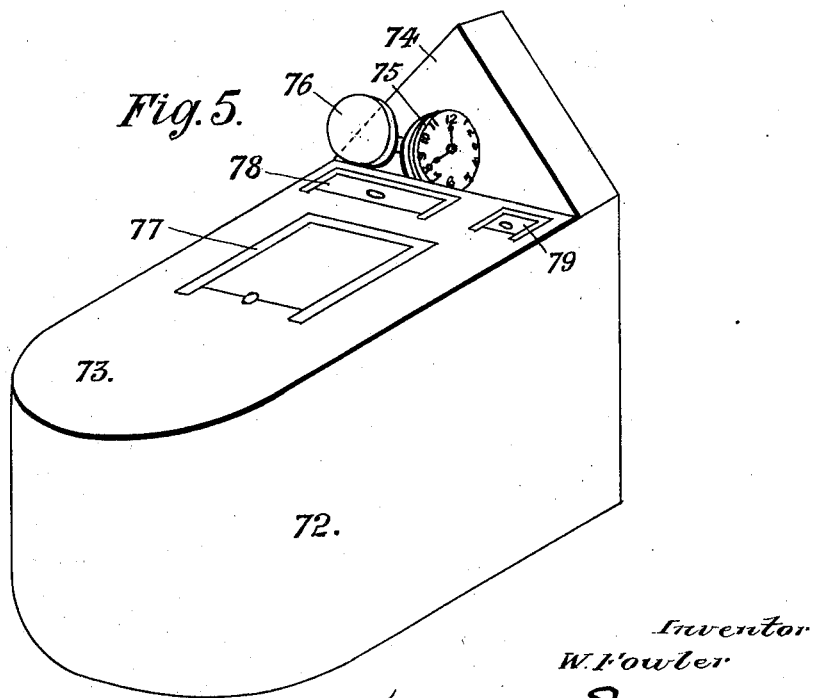
Inventor
W. Fowler
by
Attorney
Witnesses

UNITED STATES PATENT OFFICE.

WILLIAM FOWLER, OF CANTERBURY, ENGLAND.

COOKING APPARATUS.

976,646.  Specification of Letters Patent.  Patented Nov. 22, 1910.

Application filed May 6, 1910. Serial No. 559,706.

*To all whom it may concern:*

Be it known that I, WILLIAM FOWLER, a subject of the King of England, residing at 9 G. Quarters, The Barracks, Canterbury, in the county of Kent, England, have invented a Cooking Apparatus, of which the following is a specification.

This invention has reference to heating and cooking by oil and spirit stoves, and has reference more particularly to apparatus wherein the stoves are lighted automatically at a predetermined time through the medium of an alarm clock, and the kettle is adapted to automatically empty its contents into a receptacle, such as a teapot, upon such contents boiling.

An object of this invention is to provide improvements in apparatus of this character. Another object is to render such apparatus of greater use, while a further object is to render it serviceable in connection with shaving purposes, as well as heating and cooking purposes.

In the following description of heating and cooking apparatus, the improvements hereunder are comprised, and in the accompanying drawings, in connection with which the description is made, these improvements are illustrated.

Figure 1:
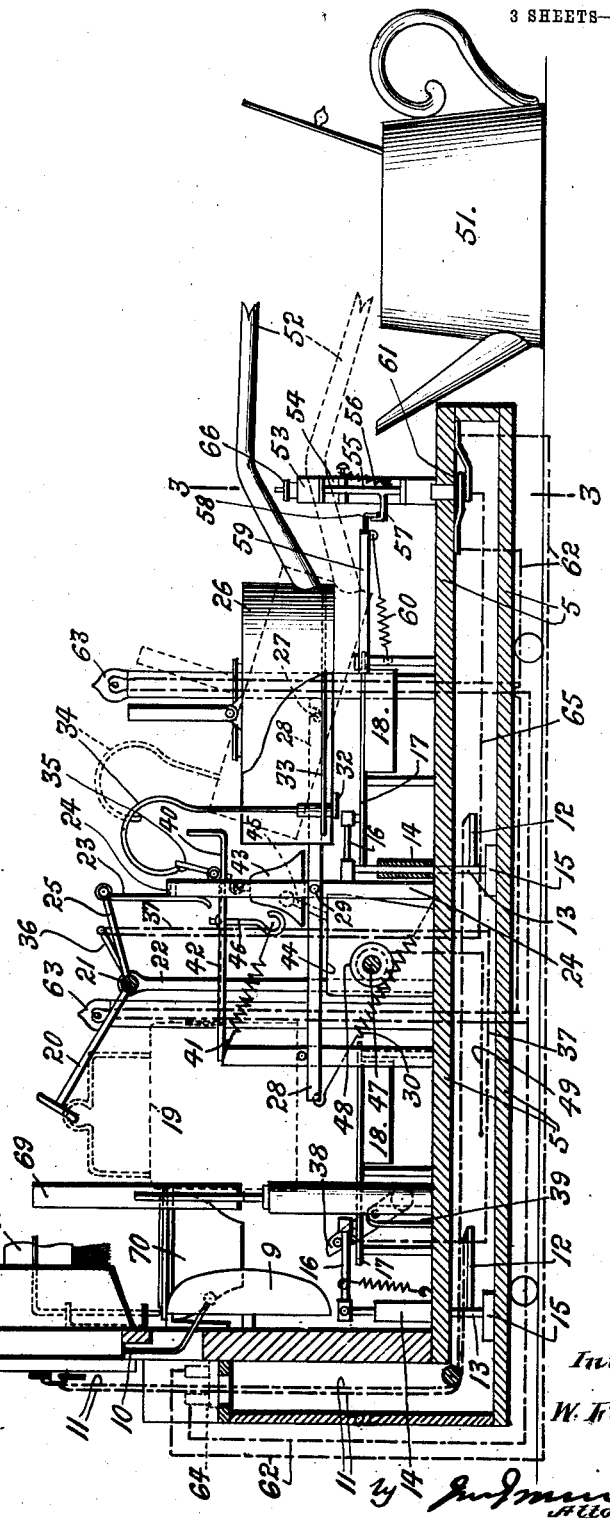
Figure 2:
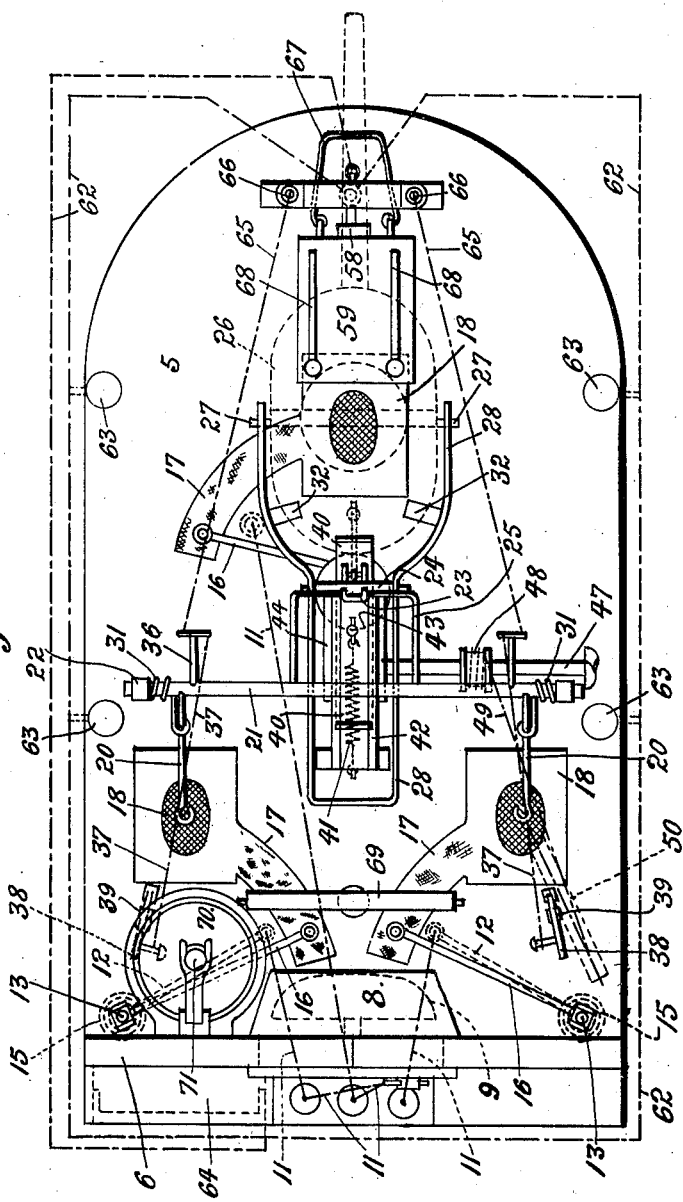

Referring to the accompanying drawings, Figure 1 is a sectional elevation, and Fig. 2 a plan illustrating, more or less diagrammatically, an apparatus provided with the improvements under this invention, and adapted for heating water for cooking purposes, for making tea, coffee, or the like, and for shaving purposes. Fig. 3 is an elevation on the line 3—3 Fig. 1, and Fig. 4 a sectional elevation to a larger scale of details shown in Figs. 1 and 2, and hereinafter referred to; and Fig. 5 is an illustration of a suitable casing for the apparatus, hereinafter referred to.

5 is a suitable base fitted with a vertical support 6 on which is mounted an alarm clock or clockwork mechanism 8, a bell or like dome 9, and a hammer device 10 connected with the clock, and by means of which an audible signal is given in conjunction with the dome 9.

The alarm portion of the clock or like mechanism is adapted to release trigger or like devices, such as cords, wires, chains, or their equivalents 11, which are connected at one end to the alarm spring arbor by a ring, hook, or the like, and are released automatically therefrom when the arbor unwinds during the operation of the alarm. The other end of the cords or the like are connected to arms 12 of the spring actuated rods 13, which are supported in bearings 14, and actuated by coiled springs 15 which serve to partly rotate the arms 16, fitted on the upper ends of the rods 13. The outer ends of each of the arms 16 are fitted with means for holding matches or other like devices adapted to be ignited by being rubbed on abrading or roughened surfaces 17, and during such partial rotation and ignition, the matches are moved toward the oil or spirit stoves 18 over or on which they stop, or are arrested as hereinafter described, and ignite the oil or spirit supplied thereto. The said surfaces and stoves are mounted on the base 5 as shown.

Upon the ignition of the oil or spirit, heat is supplied to the heating and cooking vessels, such as a saucepan 19 (shown in dotted lines Fig. 1) suitably suspended from overhead supports 20 carried by a rockable spindle 21 which is mounted in uprights 22; and held in the supporting position by a catch device 23 engaging with a frame 24, such catch being attached to the spindle 21 through the arms 25; and a kettle 26 (illustrated in section to a larger scale in Fig. 4) carried on pins 27 in a frame 28 which is pivotally mounted at 29 on the frame 24; the frame 28 being controlled in the movements by a spring 30, and the supports 20 by springs 31 arranged in connection with the spindle 21 and uprights 22, while projections 32 are provided on the frame 28 for supporting the rear portion of the kettle 26.

The quantities of water supplied to the various heating and cooking vessels are so arranged relatively to each other, or the sizes of such vessels are such, that upon the water boiling in the kettle, the water in the other vessels, or the articles to be cooked therein, is or are heated or cooked to the predetermined degree required. To enable this to be carried out in another way, the sizes of the various stoves may vary to enable greater or lesser heating effect to be obtained from each.

The kettle is fitted with a bellows device 33, (see Fig. 4) consisting of a plate hinged at one end, and adapted to normally rest in proximity to the bottom of, and within the kettle. To such plate is removably fitted in a socket, a hook 34 which is adapted to engage with a pivotally mounted catch 35, when the apparatus as a whole is adjusted and set for automatically coming into operation at a predetermined time. The mounting of the catch 35 in a pivotal bearing enables it to pass under the hook 23 in the event of its being engaged with the hook 24. When the water in the kettle boils, the bellows device 33 is agitated and this imparts movement to the hook 34 and released the pivotally mounted catch 35, and this causes the release of the catch device 23 from the frame 24 as hereinafter described, and the removal of the means whereby the saucepans are held suspended over the stoves. As the saucepans are thus left without any means for supporting them, they descend by their own weight and the weight of their contents, on to the stoves and extinguish the same, at the same time rocking the spindle 21 and the arms thereon, as well as the arms 36 which are connected by cords, chains or their equivalents 37 to the weighted levers 38 which are pivotally mounted in supports 39 fixed to the base 5, and adapted to arrest the arms 16 carrying the matches or the like with the latter over the stoves. When the spindle 21 is rocked as above described the weighted levers 38 are pulled clear of the match carrying arms 16 and allow these to travel clear and away from the stoves beneath the saucepans 19. By this means the latter are permitted to descend completely, and rest on the stoves 18 and so extinguish the flames rising therefrom. The means for extinguishing the flames beneath the kettle are described farther on.

The pivotally mounted catch 35 is carried on a plate 40 which is controlled by a spring 41, and adapted to slide in a guide 42, and such catch 35 is provided with a depending portion which is adapted to engage with the bottom of the guide 42 during the rearward movement of the plate 40, and thus cause the upper end of the catch 35 to come in contact with the catch device 23 and remove it out of engagement with the frame 24. When the apparatus is set, the plate 40 is held in its forward position against the tension of the spring 41, by the hook 34 of the kettle, but when the hook is released as previously stated, the spring returns the plate 40 to its rear position and effects the release of the catch 23.

A second alarm or audible signal device adapted to come into operation when the heating and cooking is finished, is attached to the frame 24. Such second alarm comprises a bell 43 and a clockwork mechanism contained in a casing 44, and having a hammer 45 projecting within the bell. This alarm is prevented from coming into operation until the release of the catch 35 is effected, by a depending pin 46 (to which one end of the spring 41 is attached) attached to the plate 40 and bearing against the bell 43 and holding the latter against the said hammer 45. Upon the release of the catch 35 from the hook 34, the plate 40 moves rearwardly and with it the pin 46, and thereby removes the latter away from the bell 43 and allows its spring actuating mechanism to come into operation for sounding the alarm. This second alarm mechanism is wound by rotating the spindle 47 through the medium of the handle fitted on its end. On the spindle 47 is mounted a barrel 48 on which is wound one end of a cord, chain, or the like 49, the other end of the cord or the like being attached to a strainer or like device for one of the saucepans 19, and the intermediate portion passing beneath the base 5 and up on to a vertical post provided with a horizontal member 50 (see Fig. 2, shown in dotted lines) from which the end connected with the strainer is suspended. When the second alarm is freed, the spindle 47 rotates and winds the cord 49 thereon, and so raises the strainer from the saucepan, which during this operation is being lowered onto the stove as hereinbefore explained.

When the water in the kettle boils and causes the disengagement of the hook 34 from the catch 35, the kettle rocks forwardly about the pins 27 to the position shown in dotted lines in Fig. 1, owing to the forward part of the kettle and its contents being of greater weight than the rear portion, and the forward end of the frame is rocked upwardly about the pivot bearing 29 by the spring 30; as the kettle empties its contents into a teapot or like vessel, by means of its spout 52, which, during the movement of the kettle is brought into contact with a vertical sliding device as shown in Fig. 3. This device comprises a horizontal member 53 provided with guide rods adapted to work in a guide frame 54 mounted on the base 5, and a central depending rod 55 which is controlled by a spring 56 attached thereto and the guide frame 54. The rod 55 is provided with a rearwardly projecting arm 57 adapted to engage with a finger 58 on the end of a plate 59 which is capable of sliding over the upper surface of the stove beneath the kettle, and beneath the match carrying arm 16, when this is disposed above the stove, for extinguishing the flames. When the kettle spout depresses the member 53 as above explained, against the tension of the spring 56, the arm 57 is disengaged from the finger 58, and releases the plate 59 which is moved over and comes to rest on the top of the said stove, as previously explained, by means of a spring 60; the downward movement of the member 53 also causes the lower end of the rod 55 to come in contact with the knob of an electric switch 61 connected by electric leads 62 to lamps 63 and battery 64—contained in a casing attached to the support 6,—and causes the lamps to be illuminated for the purpose of giving light to the apartment or other place wherein the apparatus is placed; further, to such horizontal member 53 of the vertical sliding device are also attached cords, chains, or their equivalents 65 which connect it with the arms 36 of the spindle 21, and thereby enable the movements of the latter to be controlled and also adjusted, which latter is effected by means of the nuts and bolts 66 attached to the member 53; by this means the amount of vertical movement of the saucepans is regulated. The plate 59 is moved into the open position by means of a loop or equivalent device 67, and is held onto the top of the stove by bolts passing through the guide slots 68 formed therein. The apparatus is further provided with a shaving glass 69 suitably supported on the base 5, and shaving soap dish 70 and brush 71 suitably supported on the vertical support 6.

The apparatus is provided with a casing 72 having a sloping upper surface 73, and a projecting upper portion 74 adapted to inclose the upper part of the vertical support 6. In this upper part an aperture 75 is provided to enable the clock 8 to be seen when the door 76 of the casing is open. The sloping surface 73 is provided with frames fitted with suitable covers for writing materials, that designated by 77 being adapted to cover writing paper, the frame serving as a means for holding this in position, while the covers 78 and 79, respectively, serve to cover apertures or recesses containing writing implements and ink.

In setting the apparatus, the clockwork mechanism is set to give an alarm at a predetermined time, the cords or the like of the match carrying arms are detachably attached to the alarm spindle of the clock, which causes the said arms to be moved to the rear end of the match striking surfaces, matches are so fitted into the match carrying arms as to cause them to come in contact with the said surfaces when the arms are automatically released, the heating and cooking vessels are provided with water or other liquid, and any article or articles to be cooked or heated, and are set in position, the plate 40 is moved forwardly to enable the catch 35 to be engaged with the hook 34, and the catch 23 engaged with the frame 24 as shown in Figs. 1 and 2. In setting the various parts as above, the other parts of the apparatus are automatically restored to their normal positions by the various springs and connections.

What is claimed is:—

1. Automatic apparatus for heating and cooking purposes comprising a clockwork mechanism, spring controlled match carrying devices, means connecting the match devices with the clockwork mechanism, oil spirit stoves provided with abrading surfaces for igniting the matches for the purpose of lighting the stoves, heating vessels disposed over the stoves, a bellows device provided in one of the heating vessels, and which is actuated by boiling liquid, supports for the heating vessels, and a trigger device connecting the supports with the bellows device, whereby the heating vessels are held at a distance above the stoves and when released serve as means for extinguishing the stoves.

2. Automatic apparatus for heating and cooking purposes comprising a clockwork mechanism, spring controlled match carrying devices, means connecting the match carrying devices with the clockwork mechanism, oil spirit stoves provided with abrading surfaces for igniting the matches for the purpose of lighting the stoves, a kettle containing a bellows device and disposed above one of the stoves, heating vessels disposed above the remaining stoves, a pivotally mounted tiltable support for the kettle, a trigger device connecting the bellows device with the tiltable support and which is released from the tiltable support when the water boils and causes the kettle to tilt forwardly for emptying its contents, an extinguishing plate provided with means for holding it in the open position, and for closing it over the oil stove of the kettle when the kettle tilts forwardly, and supports for the remaining heating vessels provided with means of connection with the trigger device whereby the vessels are carried above the remaining stoves and when released descend onto the stoves and extinguish the same.

3. Automatic apparatus for heating and cooking purposes comprising a clockwork mechanism, spring controlled match carrying devices, means connecting the match devices with the clock work mechanism, oil spirit stoves provided with abrading surfaces for igniting the matches for the purpose of lighting the stoves, a kettle containing a bellows device and disposed above one of the stoves, heating vessels disposed above the remaining stoves, a pivotally mounted tiltable support for the kettle, a trigger device connecting the bellows device with the tiltable support and which is released from the tiltable support when the water boils and causes the kettle to tilt forwardly for emptying its contents, a spring actuated extinguishing plate for the kettle stove, a spring controlled catch for holding the plate in the open position and provided with a member arranged in line with a part of the kettle which bears against it when the kettle tilts forwardly and releases the plate and extinguishes the kettle stove, and supports for the remaining heating vessels provided with means of connection with the trigger device whereby the vessels are carried above the remaining stoves and when released descend on to the stoves and extinguish the same.

4. Automatic apparatus for heating and cooking purposes comprising a clockwork mechanism, spring controlled match carrying devices, means connecting the match devices with the clockwork mechanism, oil spirit stoves provided with abrading surfaces for igniting the matches for the purpose of lighting the stoves, a kettle containing a bellows device and disposed above one of the stoves, heating vessels disposed above the remaining stoves, a pivotally mounted tiltable support for the kettle, a trigger device connecting the bellows device with the tiltable support and which is released from the tiltable support when the water boils and causes the kettle to tilt forwardly for emptying its contents, an extinguishing plate for the kettle stove, a spring controlled catch for holding the plate in the open position and provided with a member arranged in line with a part of the kettle which bears against it when the kettle tilts forwardly and releases the plate and extinguishes the kettle stove, a source of electricity, electric lamps, a switch and circuits connecting the lamps and said source of electricity, means connected with the spring catch for actuating the switch when the kettle tilts forwardly, and supports for the remaining heating vessels provided with means of connection with the trigger device whereby the vessels are carried above the remaining stoves and when released descend onto the stoves and extinguish the same.

5. The automatic apparatus for heating and cooking purposes, comprising a clockwork mechanism having an alarm device, spring controlled match carrying devices, flexible connections between the match devices and clockwork mechanism; oil spirit stoves; match igniting surfaces; a kettle having a bellows device; a spring controlled tiltable frame which supports the kettle over one of the stoves; a trigger device connected with the kettle bellows; cooking and heating vessels; supports for the latter; a sliding plate connecting the said supports with the trigger device, whereby the kettle and heating and cooking vessels are held above the stoves, and the heating and cooking vessels caused to descend by their own weight for extinguishing the stoves when the trigger and sliding plate become disconnected when the kettle boils; a spring actuated extinguishing plate for the kettle stove; a spring controlled catch for holding the extinguishing plate in the open position having a member arranged in line with the kettle spout, and which is actuated when the kettle tilts forwardly, and the extinguishing plate released; a strainer device; a spring mechanism for raising the strainer device; an alarm device actuated by the said spring mechanism; a source of electricity; electric lamps; a switch and circuits connecting the lamps and said source of electricity; means connected with the spring controlled catch for actuating the switch when the kettle tilts forwardly; a base and vertical member for supporting the whole of the mechanism constituting the apparatus; and a cover for inclosing the apparatus and provided with writing materials and shaped to serve as a writing desk.

6. In an apparatus of the class described, the combination with automatic clock mechanism, stoves, match igniting devices adjacent the stoves and coöperating therewith, means connecting the match igniting devices and the automatic clock mechanism, heating vessels located over the stoves, means for holding the heating vessels spaced above the stoves, and means actuated by the boiling of the liquid contained in one of the vessels for releasing the latter to permit them to move toward the stoves to extinguish the flames.

7. In an apparatus of the class described, the combination of an automatic clock work mechanism, a stove, an automatic match igniting device adjacent the stove, means connecting the automatic clock work mechanism and the automatic match igniting device, a tilting vessel mounted above the stove trigger mechanism for holding the vessel in normal spaced position over the stove, and including an element operable by the liquid in the vessel reaching the boiling point, an automatic flame extinguishing device adjacent the stove and the vessel, whereby when the water boils the trigger mechanism will be operated and the vessel will be tilted and in its movement contact with the flame extinguishing device and extinguish the flame.

8. In an apparatus of the class described the combination of automatic clock work mechanism, a stove, a track extending from the stove and having an abrading surface, a pivotally match holding device located to sweep a match over the abrading surface, a spring for placing the match holding device under tension, a connection between the match holding device and the automatic clock work mechanism, a tilting vessel, trigger mechanism for holding the vessel in operative position over the stove and including means operable by the heating of the contents of the vessel to release the latter to permit it to tilt, a flame extinguishing device located adjacent one end of the tilting vessel and the stove and including a slide adapted to be projected over the stove, said extinguishing device having a latch adapted to be released by the tilting of the vessel when the trigger device is automatically released whereby the slide extinguishes the flame.

9. In an apparatus of the class described, the combination of automatic clock work mechanism, a stove, automatic igniting means, a connection between the automatic means and the stove, a vessel over the stove, means for supporting the vessel, a second stove, automatic igniting means adjacent the second stove, means connecting the latter igniting means and the automatic clock work, a tilting vessel mounted over the second stove, an automatic flame extinguisher adjacent the second mentioned stove and the tilting vessel and adapted to be operated by the tilting of the vessel, an alarm, and trigger mechanism for holding the two vessels in position over the stoves and holding the alarm against operation, an including device operable by the heating of the contents of the tilting vessel, whereby the tilting vessel will be released and the automatic flame extinguisher will be operated to extinguish the flame under the said tilting vessel, and the supporting means will be released and permit the first mentioned vessel to drop and extinguish the flame there under and the alarm will be sounded.

10. In an apparatus of the class described, the combination with automatic clock work mechanism, a stove, an automatic igniter, means connecting the automatic clock work mechanism and the igniter, a tilting vessel over the stove, means for holding the tilting vessel in operative position over the stove, and including a trigger connected with a pivoted plate in the vessel, an extinguisher including a sliding plate adapted to be projected over the stove, a spring latch for the extinguisher, the said extinguisher being located in the path of movement of the tilting vessel, whereby when the trigger is released by the boiling contents operating on the plate the vessel will be released, and the extinguisher will be automatically operated to extinguish the flame.

In testimony whereof I have signed my name to this specification in the presence of the two subscribing witnesses.

WILLIAM FOWLER.

Witnesses:
M. A. T. GAYWOOD,
S. J. EARL.